(12) United States Patent
Brunner

(10) Patent No.: US 8,705,811 B1
(45) Date of Patent: Apr. 22, 2014

(54) LUMINANCE ADJUSTED FACE DETECTION

(75) Inventor: Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 655 days.

(21) Appl. No.: 12/912,620

(22) Filed: Oct. 26, 2010

(51) Int. Cl.
*G06K 9/00* (2006.01)
*G06K 9/40* (2006.01)
*G06K 9/20* (2006.01)
*H04N 5/225* (2006.01)
*H04N 9/73* (2006.01)

(52) U.S. Cl.
USPC ........... 382/118; 382/165; 382/167; 382/274; 382/283; 348/169; 348/223.1

(58) Field of Classification Search
USPC .......... 382/118, 165, 167, 274, 283; 348/169, 348/223.1
See application file for complete search history.

(56) References Cited

U.S. PATENT DOCUMENTS

| | | | |
|---|---|---|---|
| 5,473,709 A | 12/1995 | Aoki | |
| 5,748,197 A | 5/1998 | Guibas et al. | |
| 5,751,852 A | 5/1998 | Marimont et al. | |
| 5,781,650 A | 7/1998 | Lobo et al. | |
| 6,148,092 A | 11/2000 | Qian | |
| 6,850,272 B1 * | 2/2005 | Terashita | 348/223.1 |
| 6,859,546 B2 * | 2/2005 | Matsukawa et al. | 382/103 |
| 7,227,977 B1 | 6/2007 | Dotsenko | |
| 7,333,648 B2 | 2/2008 | Edic et al. | |
| 7,551,173 B2 | 6/2009 | Cao | |
| 7,587,068 B1 | 9/2009 | Steinberg et al. | |
| 7,853,086 B2 * | 12/2010 | Kitamura | 382/224 |
| 8,155,454 B2 * | 4/2012 | Raveendran | 382/232 |
| 8,406,482 B1 * | 3/2013 | Chien et al. | 382/118 |
| 2003/0007685 A1 | 1/2003 | Tsai et al. | |
| 2006/0088207 A1 * | 4/2006 | Schneiderman | 382/159 |
| 2006/0285750 A1 * | 12/2006 | Okada et al. | 382/190 |
| 2007/0122010 A1 * | 5/2007 | Kitamura et al. | 382/118 |
| 2007/0172099 A1 | 7/2007 | Park et al. | |
| 2007/0292019 A1 * | 12/2007 | Terakawa | 382/159 |
| 2008/0144892 A1 | 6/2008 | Lu et al. | |
| 2008/0205712 A1 | 8/2008 | Ionita et al. | |
| 2009/0263022 A1 * | 10/2009 | Petrescu et al. | 382/195 |
| 2010/0014721 A1 * | 1/2010 | Steinberg et al. | 382/118 |
| 2010/0030578 A1 * | 2/2010 | Siddique et al. | 705/3 |
| 2010/0145898 A1 | 6/2010 | Malfliet et al. | |

FOREIGN PATENT DOCUMENTS

EP 1499110 A2 1/2005

OTHER PUBLICATIONS

Anifantis et al, A Neural Network Method for Accurate Face Detection on Arbitrary images, IEEE, 1999, pp. 109-112.*

Hjelmas, Erik, et al., "Face Detection: A Survey", Computer Vision and Image Understanding 83, 2001, pp. 236-274, Academic Press.

(Continued)

*Primary Examiner* — Kathleen Y Dulaney
(74) *Attorney, Agent, or Firm* — Wong, Cabello, Lutsch, Rutherford & Brucculeri, LLP

(57) ABSTRACT

Methods, systems, and apparatus, including computer programs encoded on a computer storage medium, are described for adjusting luminance of a candidate window prior to facial detection processing. In one aspect, a method includes establishing a target region of an image that potentially contains at least a portion of a face. The method further includes establishing an inset region inside the established target region. The inset region is sized to include a predetermined fraction of the target region. Furthermore, the method includes detecting a face within the established target region of the image using the established inset region.

30 Claims, 8 Drawing Sheets

(56) References Cited

OTHER PUBLICATIONS

Yang, Ming-Hsuan, et al., "Detecting Faces in Images: A Survey", IEEE Transactions on Pattern Analysis and Machine Intelligence, Jan. 2002, pp. 34-58, vol. 24, No. 1.

Tsapatsoulis et al., "Facial Image Indexing in Multimedia Databases", Pattern Analysis & Applications (2001) 4:93-107.

Viola et al., "Robust Real-time Object Detection", Second International Workshop on Statistical and Computational Theories of Vision—Modeling, Learning, Computing, and Sampling. Vancouver, Canada, Jul. 13, 2001, pp. 1-25.

Ming-Hsuan Yang, "Recent Advances in Face Detection", Honda Research Institute, Mountain View, California, USA. ICPR 2004, pp. 1-93.

Yun et al., "Local Normalization with Optimal Adaptive Correlation for Automatic and Robust Face Detection on Video Sequences", Tenth IEEE International Symposium on Multimedia, 2008, pp. 160-165.

\* cited by examiner

LUMINANCE ADJUSTED FACE DETECTION

BACKGROUND

This specification relates to face detection, and specifically to luminance adjusted face detection.

Digital images are being used in increasingly more applications. In many of those applications, automated analysis of digital images can be performed to provide either or both of face detection and face recognition. In face detection, an image region is identified as depicting the face of a human (or other) being. In face recognition, a detected face is identified as corresponding to a specific, known individual. Face detection and face recognition can be used for a wide variety of tasks, including image enhancement, content-based retrieval, automatic identification, and image database management. For instance, in image processing applications, face detection can be used to automatically perform enhancements, such as red-eye correction and contrast adjustment. Further, face recognition can be used in conjunction with search applications that retrieve images depicting a particular individual.

Real-time face detection algorithms include, for example, the Viola-Jones algorithm, have been developed for performing face detection in digital images. The Viola-Jones algorithm searches pixels of a candidate window using multiple classifiers, with each classifier configured to select particular visual features (e.g., eyes, nose, and mouth) from a set of possible visual features. Further, the classifiers are grouped in stages, which are cascaded. As a result, only candidate windows that pass the classifiers of the current stage are submitted for further analysis to the classifiers of a subsequent stage.

SUMMARY

This specification describes, among other things, technologies relating to adjusting luminance of a candidate window prior to facial detection processing. A luminance variance can be normalized within a candidate window to enhance contrast of an analyzed region of the image, and thus, to improve the likelihood for success of a classifier-based facial detection process subsequently applied to the candidate window having normalized luminance variance.

In general, one aspect of the subject matter described in this specification can be implemented in methods that include the actions of establishing a target region of an image that potentially contains at least a portion of a face. The methods further include establishing an inset region inside the established target region. The inset region is sized to include a predetermined fraction of the target region. Furthermore, the methods include detecting a face within the established target region of the image using the established inset region.

Implementations can optionally include one or more of the following features. Prior to detecting, the methods can further include normalizing a luminance variance of the inset region to obtain a normalization scale, and normalizing a luminance variance of the target region of the image based on the obtained normalization scale. Before establishing the target region and the inset region, the methods can also include establishing a combination of color space component values weighted to generate skin-tone bias, and converting color data associated with the image to skin-tone-biased luminance data in accordance with the established combination. Normalizing the luminance variance of the inset region, normalizing the luminance variance of the target region, and detecting the face can be performed on the converted skin-tone-biased luminance data.

In some implementations, the predetermined fraction of the target region of the image included in the inset region is larger than a first fractional value. Further, the predetermined fraction of the target region of the image included in the inset region can be less than a second fractional value. For example, the first and second fractional values can be 80% and 90%, respectively. As another example, the predetermined fraction of the target region of the image included in the inset region can be substantially 85%.

In some implementations, the inset region can correspond to a convex portion of the target region of the image, such that the portion has a size equal to the predetermined fraction of the target region. In some implementations, the portion of the target region of the image corresponding to the inset region can be sized and positioned relative to the target region such that, when the target region may inscribe a face, the inset region is (i) sufficiently large to include at least eyes, a nose and a mouth of the inscribed face, and is (ii) sufficiently small to exclude portions of the established target region that are not part of the inscribed face.

In some implementations, the inset region can correspond to portions of the target region of the image excluding outlier values of luminance, such that the portions have a cumulative size equal the predetermined fraction of the target region.

Another aspect of the subject matter described in this specification can be implemented in methods that include the actions of establishing a combination of color space component values weighted to generate skin-tone bias. The methods also include converting color data associated with an image to skin-tone-biased luminance data in accordance with the established combination. Further, the methods include establishing a target region of the image that potentially contains at least a portion of a face, and normalizing a variance of the converted skin-tone-biased luminance data associated with the target region of the image. In addition, the methods include detecting a face within the target region of the image after said normalizing.

Implementations can optionally include one or more of the following features. The methods can include establishing an inset region inside the established target region, such that the inset region is sized to include a predetermined fraction of the target region. The methods can further include normalizing a luminance variance of the converted skin-tone-biased data of the inset region to obtain a normalization scale. Normalizing the variance of the converted skin-tone-biased luminance data associated with the target region of the image can be performed in accordance with the obtained normalization scale.

The subject matter described in this specification can be implemented as a method or as a system or using computer program products, tangibly embodied in information carriers, such as a CD-ROM, a DVD-ROM, a HD-DVD-ROM, a Blue-Ray drive, a semiconductor memory, and a hard disk. Such computer program products may cause a data processing apparatus to conduct one or more operations described in this specification.

The subject matter described in this specification can also be implemented as an appliance including a processor and a memory coupled to the processor. The memory may encode one or more programs that cause the processor to perform one or more of the method acts described in this specification. Further the subject matter described in this specification can be implemented using various data processing machines.

Particular implementations of the subject matter described in this specification can be configured so as to realize one or more of the following potential advantages. By normalizing luminance variance within a candidate window potentially depicting a face based on normalization scaling corresponding to a corresponding inset region, pixels from outside a face are prevented from contributing to, and possibly skewing, the normalization process.

The details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Techniques and systems disclosed in this specification can be implemented, among other things, to determine a scale for normalizing the luminance variance within a candidate window based on luminance data inside an inset rectangle, thereby increasing the contrast on the person's face. As a result, contributions from areas near the edges of the candidate window that are outside the person's face are minimized. The relative size of the inset rectangle (to the candidate window) can be determined experimentally.

Further, the techniques and systems disclosed in this specification can be implemented to perform the normalization of the luminance variance inside the candidate window after eliminating outlier luminance data. This is equivalent to determining the scale for normalizing the luminance variance within the candidate window based on luminance data inside an inset region of the candidate window such that the inset region has a predetermined relative size (to the candidate window) and excludes pixels corresponding to luminance outliers.

Furthermore, the techniques and systems disclosed in this specification can be implemented to perform a particular conversion of image data from color to grey-scale to bias the image's luminance towards skin-tone. In this manner, the contrast of face-specific features can be selectively pre-enhanced, even before normalizing the luminance variance. For example, a linear combination alpha*Y+(1-alpha)*Cr can be used (for images in YCbCr space), with alpha being in the range of 0.5-0.7 Skin-tone-biased data within candidate windows can then be normalized using either data from entire candidate windows or from respective inset regions of the candidate windows.

Figure 1A:
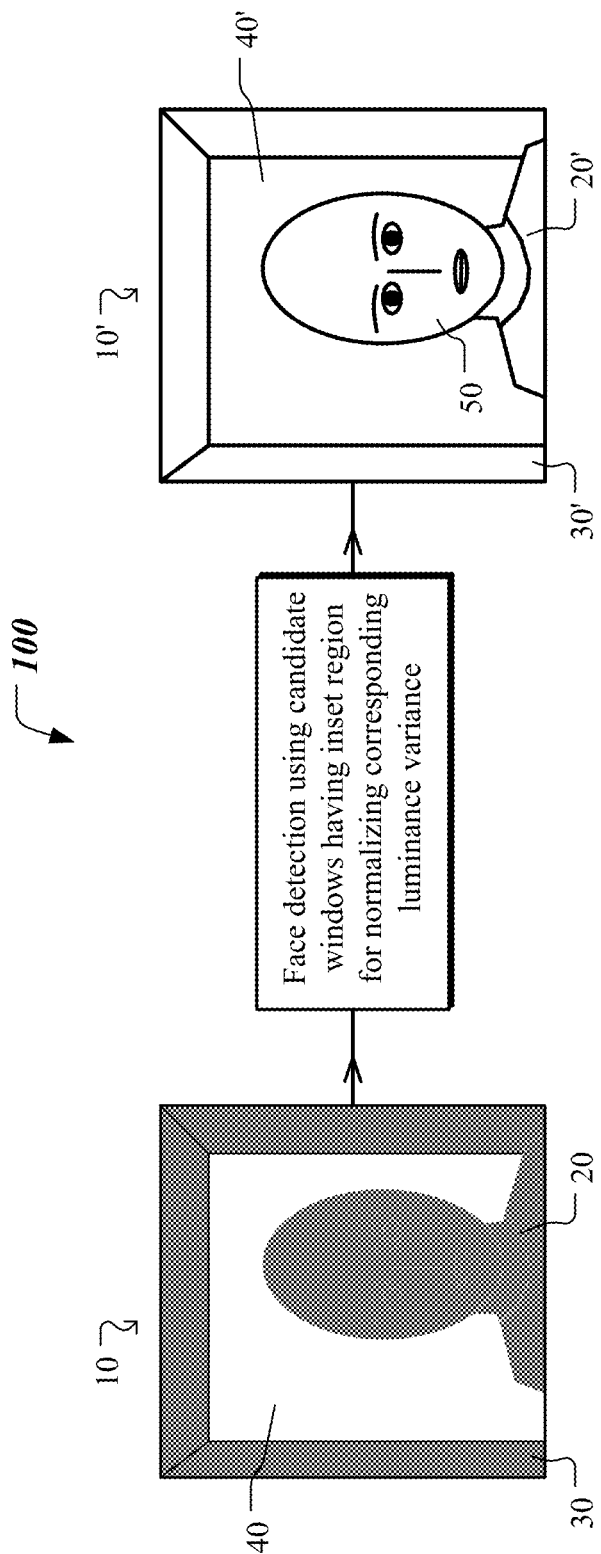
FIG. 1A is an input/output diagram of an example process for detecting faces in digital images.

FIG. 1A is an input/output diagram of an example process 100 for detecting faces in digital images using candidate windows which have an inset region for normalizing corresponding luminance variance. The process 100 can be implemented on numerous electronic devices with digital sensors, such as digital cameras, mobile phones, and the like. Throughout this specification, such devices are referred to as data processing apparatus.

An input of the process 100 can be a digital image 10. The digital image 10 depicts a scene including what appears to be a door frame 30 delimiting an inside/indoors part of the scene and an outside/outdoors part of the scene. The indoors-part of the scene includes what appears to be a human subject 20. While the background 40 included in the outdoors-part of the scene is bright, the door frame 30 and the human subject 20 are dark, potentially due to daylight outdoors and a poorly lit scene indoors. Since the contrast is poor in the region of the image 10 where the human subject 20 is represented, process 100 can be applied to determine whether the human subject 20 faces inwards (towards the camera) or outwards (away from the camera.)

An output of the process 100 can be a processed digital image 10'. In this example, the process 100 has detected a face 50 of the human subject 20' facing the camera. Further in this example, the original image 10 has been further processed to adjust the exposure of the entire processed image 10' based on optimizing a luminance median and range of the detected face 50. Consequently, the human subject 20', the door frame 30' and even the background 40' also have been adjusted based on the optimized luminance corresponding to the detected face 50 of the human subject 20'. Further processing can be applied to the processed image 10'. For example, a face recognition process can be applied to image 10' to determine an identity of the detected face 50.

The process 100 for face detection can be based on a Viola Jones algorithm described above. However, other facial detection algorithms that are known in the art, e.g., Rowley Baluja Kanade, or Schneiderman Kanade, may be chosen to perform real-time face detection over the image 10.

In some implementations of process 100, color image data is first converted to grey-scale within an image space YCrCb. "Y" represents luminance data, while (Cr, Cb) represent measures of chrominance. For example, luminance Y can be expressed in terms of an 8-bit grey-scale (with level-0 corresponding to black and level-511 corresponding to white.) In this example, the dynamic range of the luminance Y is 512 grey levels.

Candidate windows used by the process 100 can be placed over a given region of the image 10 to detect a face within the given region. As described above, a candidate window can be iteratively moved through all regions of the image 10 for identifying faces. For each rectangle position, the grey-scale image data (corresponding to luminance Y) is normalized prior to detecting a face in an attempt to reduce the influence of luminance changes across the image. Normalization within a candidate window can include scaling the luminance variance to 1 (corresponding to the luminance's dynamic range.) Accordingly, the normalized luminance variance can provide full dynamic range to subsequently applied face detection algorithms.

A normalization scale for a candidate window can be determined by dividing the luminance's dynamic range to the luminance range (largest luminance value minus smallest luminance value) within the candidate window. The normalization scale is greater than but about equal to 1 when the luminance range within the candidate window is about equal to the luminance's dynamic range. A normalization scale determined to be close to 1 can contribute minimal contrast enhancement of the analyzed region associated with the candidate window. In such instance, the benefit for the subsequent classifier-based facial detection process arising from performing the normalization of the luminance variance within the candidate window may be small. Often, the normalization scale can be significantly greater than 1 when the luminance range within the candidate window is smaller than the luminance's dynamic range. The greater (with respect to 1) the determined normalization scale is, the more significant the contrast enhancement of the analyzed region corresponding to the candidate window may be.

The luminance range within a candidate window can be very large, e.g. close to the luminance's dynamic range, because an often small fraction of the pixels within the candidate window have luminance values that are very different from luminance values of the other pixels of the candidate window. In the example illustrated in FIG. 1A, this small fraction of pixels can represent pixels from the brightly lit background 40, while the other pixels of the candidate window can represent pixels from the poorly lit human subject 20. Procedure 100 is configured to combine the methods described below in connection with FIG. 1B for eliminating the small fraction of pixels that skew the luminance range within the candidate window, and for normalizing the luminance variance within an inset region of the candidate window. A smaller luminance range of the inset region determined in accordance with the methods described below in FIGS. 2A-2C can lead to a normalization scale significantly greater than 1, which may in turn significantly enhance the contrast of the analyzed image region corresponding to the candidate window.

Figure 1B:
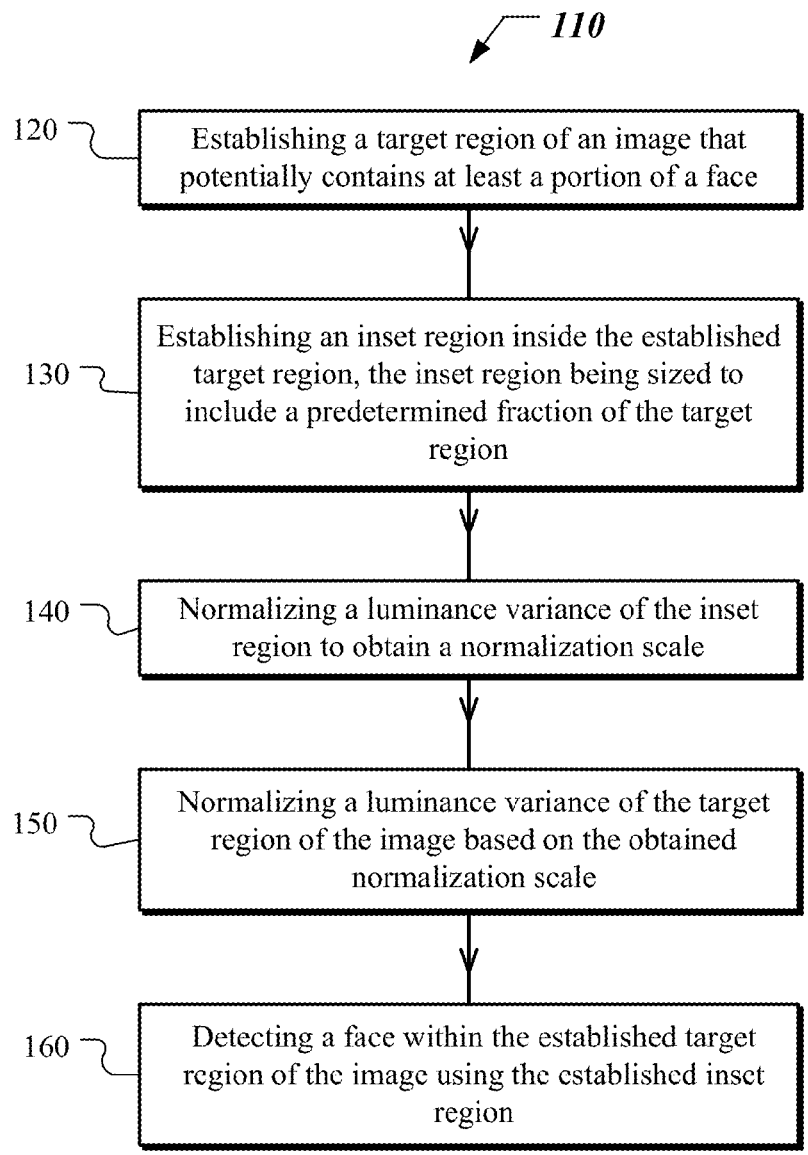
FIG. 1B is a flow chart of an example method for detecting a portion of a face depicted in an image.

FIG. 1B is a flow chart of an example method 110 for detecting a portion of a face depicted in an image by using a candidate window which has an inset region for normalizing corresponding luminance variance. In some implementations, method 110 can be performed by data processing apparatus and can be implemented as part of the process 100 illustrated in connection with FIG. 1A.

The method 110 includes establishing 120 a target region of an image that potentially contains at least a portion of a face. The target region can correspond to a candidate window of a face detection procedure, such as the Viola Jones algorithm. In some implementations, the target region can be a rectangle. In some implementations, the rectangular target region representing the candidate window can be a square. Further, the candidate window can be established 120 to have a corresponding size and can be associated with a location along a corresponding analysis path for a given stage of the Viola Jones algorithm. Examples of target regions representing candidate windows established at several locations along an analysis path are illustrated below in connection with FIGS. 2A-2C.

The method 110 also includes establishing 130 an inset region inside the established target region. The inset region is sized to include a predetermined fraction of the target region. In the example illustrated in FIG. 1A, the predetermined fraction of the target region of the image included in the inset region can be about 85%.

In some implementations, the inset region corresponds to a convex portion of the target region of the image such that the convex portion has a size equal to the predetermined fraction of the target region. The convex portion of the target image can be a convex polygon, i.e., a polygon for which all internal angles are less than or equal to 180°. In addition, a convex polygon represents, by definition, a contiguous region. The rectangle and the square are examples of convex polygons. In the example illustrated in FIG. 1A, the inset region of a square candidate window can be established 130 to be a square having an area that is about 85% of the area of the square candidate window.

In some other implementations, the inset region corresponds to a concave (non-convex,) however, contiguous portion of the target region of the image such that the concave portion has a size equal to the predetermined fraction of the target region.

In some further implementations, the inset region corresponds to non-contiguous portions of the target region of the image having a cumulative size equal the predetermined fraction of the target region, such that the pixels within the target region excluded from the inset region corresponds to outlier values of the luminance. In the example illustrated in FIG. 1A, the inset region of a square candidate window can be established 130 to have an area that is about 85% of the area of the square candidate window and to exclude 15% of the pixels within the square candidate window corresponding to the largest values of luminance within the square candidate window. In this fashion, the brightest pixels corresponding to 15% of the total pixels within the candidate window can be ignored when calculating a normalization scale.

As another example corresponding to a dark background and a brightly lit face, the inset region of a square candidate window can be established 130 to have an area that is about 85% of the area of the square candidate window and to exclude 15% of the pixels within the square candidate window corresponding to the smallest values of luminance within the square candidate window. In this manner, the darkest pixels corresponding to 15% of the total pixels within the candidate window can be ignored when calculating a normalization scale. In yet another example, it may be desired to calculate a normalization scale by ignoring the darkest and the brightest pixels within a candidate window. Consequently, the inset region of the square candidate window can be established 130 to have an area that is about 85% of the area of the square candidate window, to exclude 7.5% of the pixels within the square candidate window corresponding to the smallest values of luminance within the square candidate window, and to further exclude 7.5% of the pixels within the square candidate window corresponding to the largest values of luminance within the square candidate window.

Further, the method 110 includes normalizing 140 a luminance variance of the inset region to obtain a normalization scale. As described below in connection with FIGS. 2A-2C, normalizing 140 the luminance within the inset region can include identifying pixels of the target region that are outside the established inset region, and obtaining a normalization scale corresponding to the inset region by dividing the luminance's dynamic range to a luminance range within the inset region.

Furthermore, the method 110 includes normalizing 150 a luminance variance of the target region of the image based on the obtained normalization scale corresponding to the inset region. In an example described below in connection with FIG. 2A, when the obtained normalization scale corresponding to the inset region is larger than a normalization scale corresponding to the target region, normalizing 150 the luminance variance within the target region based on the normalization scale corresponding to the inset region can result in improved contrast for portions of a face contained in the target region relative to contrast obtained from normalizing the luminance variance within the target region based on the normalization scale corresponding to the target region. As another example described below in connection with FIGS. 2B-2C, when the obtained normalization scale corresponding to the inset region is substantially equal to the normalization scale corresponding to the target region, normalizing 150 the luminance variance within the target region based on the normalization scale corresponding to the inset region can result in contrast for portions of a face contained in the target region that is similar to contrast obtained from normalizing the luminance variance within the target region based on the normalization scale corresponding to the target region.

In addition, the method 110 includes detecting 160 a face within the established target region of the image using the established inset region. A classifier-based facial detection process, e.g. the Viola Jones algorithm, can be applied for detecting 160 portions of a face within a candidate window after having normalized the luminance variance of the candidate window in accordance with the steps 130, 140 and 150 described above.

Figure 2A:
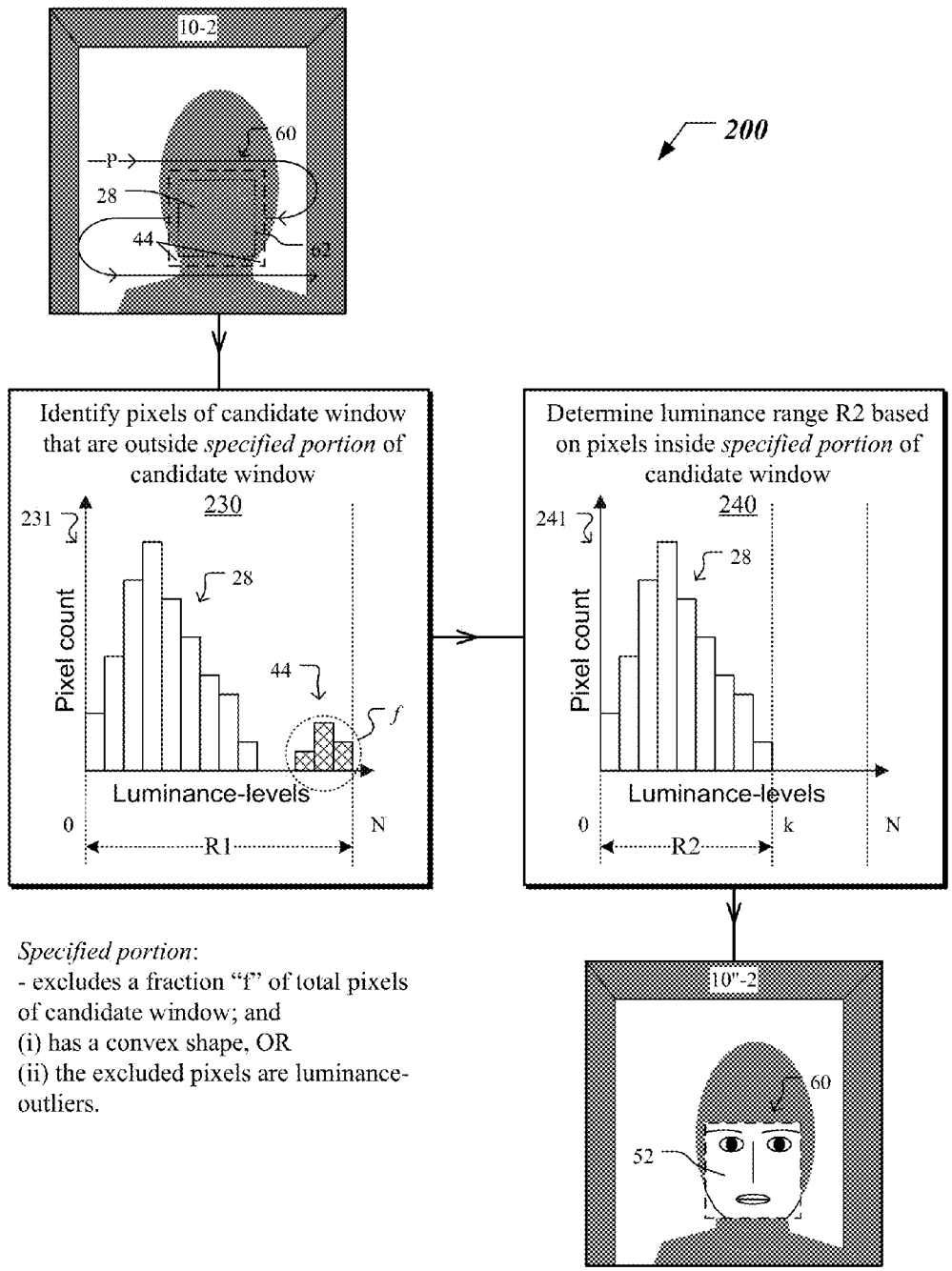
FIGS. 2A, 2B and 2C show aspects of an example method for normalizing a luminance variance inside a candidate window.
Figure 2B:
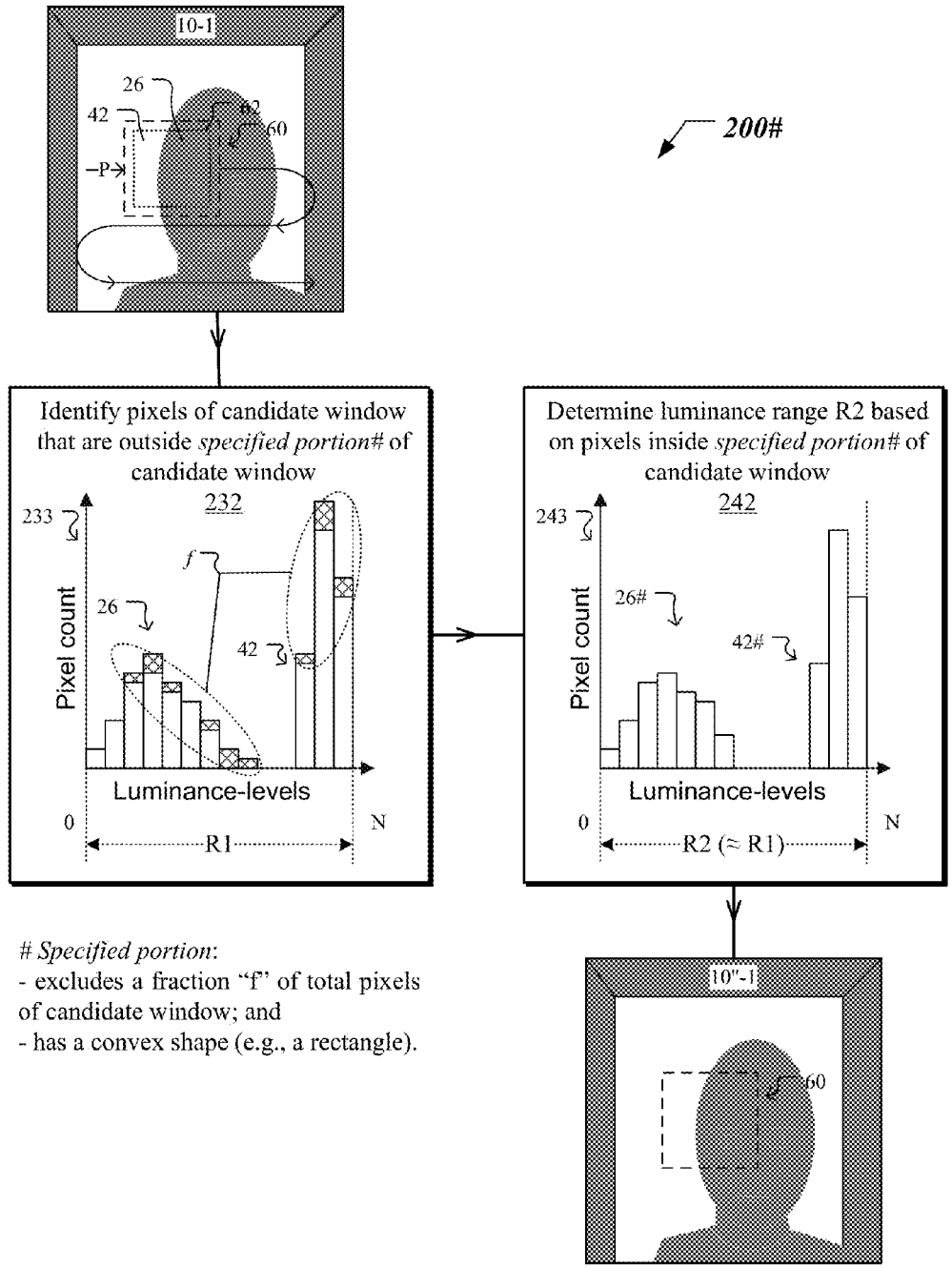
Figure 2C:
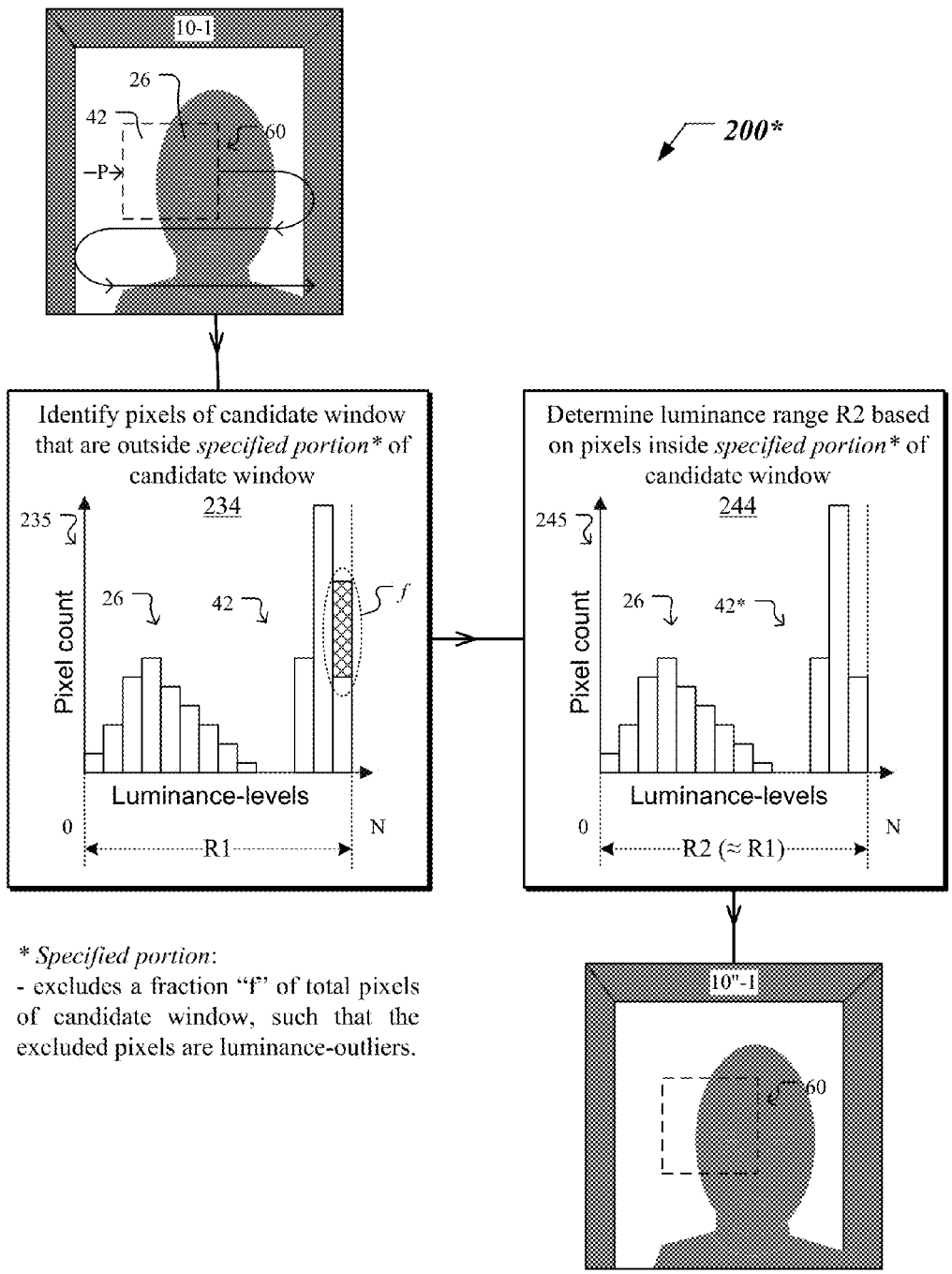

FIGS. 2A, 2B and 2C show aspects of an example method 200 for normalizing a luminance variance inside a candidate window using a normalization scale obtained by normalizing a luminance variance within an inset region of the candidate window. In some implementations, method 200 can be performed by data processing apparatus and can be combined with the process 100 and/or with method 110 described above in connection with FIGS. 1A-1B.

FIG. 2A illustrates an instance 10-2 of the digital image 10. A portion of an exemplary analysis path "P" is depicted as a continuous-line serpentine overlaid on the instance 10-2 of the digital image 10. Analysis along a serpentine-shaped path can be performed such that successive scan-lines are processed from left-to-right and right-to-left, respectively. However, the analysis path "P" can have multiple other shapes. For example, the analysis path "P" can be shaped as a raster path. Analysis along a raster-shaped path can be performed such that each scan-line is processed left-to-right, from the top to the bottom of the digital image 10.

Additionally, a candidate window 60 is applied to the instance 10-2 of the digital image 10 at a location "2" along the analysis path "P". The candidate window 60 is depicted as a dashed-line square. Moreover, the candidate window 60 placed at location "2" of analysis path "P" can correspond to an intermediate stage of the method 110 corresponding to establishing 120 of a target region 60 of the instance 10-2 of the digital image 10 that potentially contains at least a portion of a face.

A set of pixels 28 within the candidate window 60 has low luminance values and potentially corresponds to a portion of a back-lit face. Another set of pixels 44 within the candidate window 60 has high luminance values and corresponds to a bright background. At the location "2" along the analysis path "P", the set of pixels 44 represents a small fraction of the total pixels of the candidate window 60.

The method 200 includes identifying 230 pixels of the candidate window 60 outside of a specified portion of the candidate window 60. In accordance with the stage 130 of method 110, the specified portion of the candidate window 60 has a predetermined size. For example, the size of the specified portion of the candidate window is about 85% of the candidate window 60. Therefore, the specified portion of the candidate window 60 excludes a preset fraction "f" of the total pixels of the candidate window 60. For example, the specified portion of the candidate window 60 excludes about 15% of the total pixels of the candidate window 60.

The histogram 231 represents the distribution of luminance among pixels of the candidate window 60. The x-axis corresponds to the luminance's dynamic range and has 0 to N values, corresponding to the grey-levels used to represent luminance for a pixel of the candidate window 60. For example, N=511 if the luminance's dynamic range is 512 grey-levels. Luminance-values close to 0 correspond to black (dark) pixels of the candidate window; luminance values close to N correspond to white (bright) pixels of the candidate window. The y-axis corresponds to the number of pixels of the candidate window having luminosity values corresponding to each of the histogram bins. The total number of pixels of the candidate window 60 corresponds to the sum of all the bins of the histogram 231.

The histogram 231 shows that the set of pixels 28 corresponding to the dark pixels within the candidate window 60 is distributed over luminance levels in the lower-third portion the luminance's dynamic range, and that the set of pixels 44 corresponding to the bright pixels within the candidate window 60 is distributed over luminance levels grouped in a narrow interval at the high-end portion the luminance's dynamic range. Note that the histogram 231 also shows that, in this example, there is a well-defined luminance gap between the sets of pixels 28 and 44 corresponding to the dark and bright pixels, respectively, within the candidate window 60. Also note that, in this example, the luminance range R1 corresponding to the candidate window 60 is about equal to the luminance's dynamic range. Accordingly, a normalization scale corresponding to the candidate window 60 defined as the luminance's dynamic range divided by the luminance range R1 is about equal to 1.

Further, the histogram 231 illustrates that the number of pixels in the set 44 corresponds to a fraction "f" of the total number of pixels in the candidate window 60. In this example, the fraction "f" is about 15%.

In some implementations, the portion within the candidate window 60 for calculating the normalization scale can be specified to exclude a preset fraction of pixels of the candidate window 60 such that the specified portion has a convex shape. An example of the specified portion 62 is depicted as a dotted-line square within the candidate window 60. Note that the size of the inset square 62 represents about 85% of the candidate window 60 and that the inset square 62 has no common pixels with the set of pixels 44 corresponding to the bright pixels of candidate window 60. Accordingly, the set of pixels 44 can be identified 230 as pixels of the candidate window 60 that are outside the inset square 62. Note that the bins corresponding to pixels of the candidate window 60 identified 230 to be outside of the specified portion 62 are depicted as cross-hashed bins. Additionally, the fraction "f" of the total pixels of the candidate window 60 that is excluded from the specified portion 62 is encompassed by a dotted circle.

In some other implementations, the portion within the candidate window 60 for calculating the normalization scale can be specified to exclude a preset fraction of pixels of the candidate window 60 such that the excluded pixels are luminance outliers. In the example illustrated in FIG. 2A, the fraction of pixels of the candidate window 60 to be excluded from the specified portion is f=15%. Additionally, the set of pixels 44 constitutes luminance outliers and represents a fraction f=15% of the total number of pixels of the candidate window 60. Accordingly, the set of pixels 44 can be identified 230 as pixels of the candidate window 60 that are outside the inset square 62.

Method 200 includes determining 240 a luminance range R2 corresponding to the specified portion of the candidate window 60. The histogram 241 represents the distribution of luminance among pixels of the specified portion of the candidate window 60. The total number of pixels of the specified portion of the candidate window 60 corresponds to the sum of all the bins of the histogram 241.

The histogram 241 shows that the set of pixels 28 corresponding to the dark pixels within the candidate window 60 is distributed over luminance levels in the lower-third portion the luminance's dynamic range. Since the specified portion has been established to exclude a preset fraction "f" of pixels associated, in this example, to the set of pixels 44 corresponding to the bright pixels within the candidate window 60, no luminosity levels are present in the histogram 241 above the highest luminance level-k of the set of pixels 28 corresponding to the dark pixels within the candidate window 60. Note that, in this example, the luminance range R2 corresponding to the specified portion of the candidate window 60 is equal to the luminance range R2=k. Accordingly, a normalization scale corresponding to the specified portion of the candidate window 60 defined as the luminance's dynamic range divided by the luminance range R2 is equal to N/k>R1=1.

After performing method 200, the luminance variance of the candidate window 60 can be normalized 150 in accordance with the method 110. For example, normalizing 150 a luminance variance of the candidate window 60 based on the obtained normalization scale, N/k>1, corresponding to the specified portion of the candidate window 60 leads to improved contrast for portions of a face 52 contained in the candidate window 60 (as shown in instance 10"-2 of the digital image 10,) in comparison to contrast obtained from normalizing the luminance variance within the candidate window 60 based on the normalization scale corresponding to the candidate window 60 (as shown in instance 10-2 of the digital image 10.)

As described above, in this example, either way of specifying the portion of the candidate window 60, whether as (i) an inset square 62 having a predetermined size or as (ii) excluding luminance outliers and having a predetermined size, leads to similar improvement in contrast for the face 52 contained in the candidate window 60.

Multiple sizes and relative positions of the inset square 62 relative to the candidate window 60 have been tested. Detailed test results are described below in connection with FIG. 3. An exemplary finding of the test result is that the inset square 62 can be sized and positioned relative to the candidate window 60 such that, when the candidate window 60 inscribes a face, the inset square 62 is (i) sufficiently large to include at least eyes, a nose and a mouth of the inscribed face, and is (ii) sufficiently small to exclude portions of the candidate window 60 that are not part of the inscribed face.

FIG. 2B illustrates an instance 10-1 of the digital image 10. A portion of the exemplary analysis path "P" is depicted as a continuous-line serpentine overlaid on the instance 10-1 of the digital image 10. Additionally, a candidate window 60 is applied to the instance 10-1 of the digital image 10 at a location "1" along the analysis path "P". The candidate window 60 is depicted as a dashed-line square. Moreover, the candidate window 60 placed at location "1" of analysis path "P" can correspond to an intermediate stage of the method 110 corresponding to establishing 120 of a target region 60 of the instance 10-1 of the digital image 10 that potentially contains at least a portion of a face. A portion within the candidate window 60 for calculating the normalization scale can be specified to exclude a preset fraction of pixels of the candidate window 60 such that the specified portion has a convex shape. An example of the specified portion 62 is depicted as a dotted-line square within the candidate window 60.

A set of pixels 26 within the candidate window 60 has low luminance values and potentially corresponds to a portion of a back-lit face. Another set of pixels 42 within the candidate window 60 has high luminance values and corresponds to a bright background. At the location "1" along the analysis path "P", the sets of pixels 26 and 42 are approximately equal in size.

An instance 200# of the method 200 includes identifying 232 pixels of the candidate window 60 outside of an inset square 62 of the candidate window 60. In accordance with stage 130 of the method 110, the inset square 62 of the candidate window 60 has a predetermined size. For example, the size of the inset square 62 is about 85% of the candidate window 60. Therefore, the inset square 62 excludes a preset fraction "f" of the total pixels of the candidate window 60. For example, the inset square 62 excludes about 15% of the total pixels of the candidate window 60.

The histogram 233 represents the distribution of luminance among pixels of the candidate window 60. The total number of pixels of the candidate window 60 corresponds to the sum of all the bins of the histogram 233. The histogram 233 shows that the set of pixels 26 corresponding to the dark pixels within the candidate window 60 is distributed over luminance levels in the lower-third portion the luminance's dynamic range, and that the set of pixels 42 corresponding to the very bright pixels within the candidate window 60 is distributed over luminance levels grouped in a narrow interval at the high-end portion the luminance's dynamic range. Note that the histogram 233 also shows that, in this example, there is a well-defined luminance gap between the sets of pixels 26 and 42 corresponding to the dark and bright pixels, respectively, within the candidate window 60. The number of pixels of set 26 corresponding to the dark pixels within the candidate window 60 is about equal to the number of pixels of set 42 corresponding to the bright pixels within the candidate window 60.

Also note that, in this example, the luminance range R1 corresponding to the candidate window 60 is about equal to the luminance's dynamic range. Accordingly, a normalization scale corresponding to the candidate window 60 defined as the luminance's dynamic range divided by the luminance range R1 is about equal to 1.

The bins corresponding to the preset fraction "f" of pixels of the candidate window 60 identified 232 to be outside of the inset square 62 are depicted as cross-hashed portions of histogram bins. In addition, the fraction "f" of the total pixels of the candidate window 60 that are excluded from the inset square 62 is encompassed by dotted ellipses. As illustrated in the instance 10-2 of digital image 10, the pixels identified 232 to be outside of the inset square 62 include about equal numbers of bright pixels corresponding to the set of pixels 42 and dark pixels corresponding to the set of pixels 26. This is reflected in histogram 233 where the cross-hashed portions of histogram bins are substantially uniformly distributed among the bins of histogram 233.

The instance 200# of method 200 includes determining 242 a luminance range R2 corresponding to the inset square 62 of the candidate window 60. The histogram 243 represents the distribution of luminance among pixels of the inset square 62 of the candidate window 60. The total number of pixels of the inset square 62 of the candidate window 60 correspond to the sum of all the bins of the histogram 243.

The histogram 243 shows that the set of pixels 26# corresponding to the dark pixels within the inset square 62 is distributed over luminance levels in the lower-third portion the luminance's dynamic range, and that the set of pixels 42# corresponding to the bright pixels within the inset square 62 is distributed over luminance levels grouped in a narrow interval at the high-end portion the luminance's dynamic range. As in the histogram 233, note the presence of a well-defined luminance gap between the sets of pixels 26# and 42# corresponding to the dark and bright pixels, respectively, within the inset square 62. Once again, the number of pixels of set 26# corresponding to the dark pixels within the inset square 62 is about equal to the number of pixels of set 42# corresponding to the bright pixels within the inset square 62.

Also note that, in this example, the luminance range R2 corresponding to the inset square 62 is about equal to the luminance's dynamic range. Accordingly, a normalization scale corresponding to the inset square 62 defined as the luminance's dynamic range divided by the luminance range R2 is about equal to 1. Therefore, whether obtained within the entire candidate window 60 or only within an inset square 62, the respective normalization ranges are about equal to each other and equal to 1, R1=R2=1.

After performing the instance 200# of method 200, the luminance variance of the candidate window 60 can be normalized 150 in accordance with the method 110. For example, normalizing 150 a luminance variance of the candidate window 60 based on the obtained normalization scale corresponding to the inset square 62 (as shown in instance 10"-1 of the digital image 10) can lead to contrast for portions of a face contained in candidate window 60 that is similar to contrast obtained from normalizing the luminance variance within candidate window 60 based on the normalization scale corresponding to the candidate window 60 (as shown in instance 10-1 of the digital image 10.)

FIG. 2C illustrates an instance 10-1 of the digital image 10. A portion of the exemplary analysis path "P" is depicted as a continuous-line serpentine overlaid on the instance 10-1 of the digital image 10. Additionally, a candidate window 60 is applied to the instance 10-1 of the digital image 10 at a location "1" along the analysis path "P". The candidate window 60 is depicted as a dashed-line square. Moreover, the candidate window 60 placed at location "1" of analysis path "P" can correspond to an intermediate stage of the method 110 corresponding to establishing 120 of a target region 60 of the instance 10-1 of the digital image 10 that potentially contains at least a portion of a face. A portion within the candidate window 60 for calculating the normalization scale can be specified to exclude a preset fraction of pixels of the candidate window 60 such that the excluded pixels are luminance outliers.

A set of pixels 26 within the candidate window 60 has low luminance values and potentially corresponds to a portion of a back-lit face. Another set of pixels 42 within the candidate window 60 has high luminance values and corresponds to a bright background. At the location "1" along the analysis path "P", the sets of pixels 26 and 42 are approximately equal in size.

An instance 200\* of method 200 includes identifying 234 pixels of the candidate window 60 outside of a specified portion of the candidate window 60. In accordance with stage 130 of the method 110, the specified portion of the candidate window 60 has a predetermined size. For example, the size of the specified portion is about 85% of the candidate window 60. Therefore, the specified portion of the candidate window 60 excludes a preset fraction "f" of the total pixels of the candidate window 60. For example, the specified portion of the candidate window 60 excludes about 15% of the total pixels of the candidate window 60.

The histogram 235 represents the distribution of luminance among pixels of the candidate window 60. The total number of pixels of the candidate window 60 corresponds to the sum of all the bins of the histogram 235. The histogram 235 shows that the set of pixels 26 corresponding to the dark pixels within the candidate window 60 is distributed over luminance levels in the lower-third portion the luminance's dynamic range, and that the set of pixels 42 corresponding to the very bright pixels within the candidate window 60 is distributed over luminance levels grouped in a narrow interval at the high-end portion the luminance's dynamic range. Note that the histogram 235 also shows that, in this example, there is a well-defined luminance gap between the sets of pixels 26 and 42 corresponding to the dark and bright pixels, respectively, within the candidate window 60. The number of pixels of set 26 corresponding to the dark pixels within the candidate window 60 is about equal to the number of pixels of set 42 corresponding to the very bright pixels within the candidate window 60.

Also note that, in this example, the luminance range R1 corresponding to the candidate window 60 is about equal to the luminance's dynamic range. Accordingly, a normalization scale corresponding to the candidate window 60 defined as the luminance's dynamic range divided by the luminance range R1 is about equal to 1.

The bins corresponding to the preset fraction "f" of pixels of the candidate window 60 identified 232 to be outside of the specified portion of the candidate window 60 are depicted as cross-hashed portions of histogram bins. In addition, the fraction "f" of the total pixels of the candidate window 60 that is excluded from the specified portion of the candidate window 60 is encompassed by a dotted ellipse. As illustrated in the histogram 235, the pixels identified 234 to be outside of the specified portion of the candidate window 60 include outliers from among the set of pixels 42 corresponding to the bright pixels within the candidate window 60. Accordingly, the pixels identified 234 to be outside of the specified portion of the candidate window 60 are selected from the bin corresponding to the highest luminance value of the set of pixels 42.

The instance 200\* of method 200 includes determining 244 a luminance range R2 corresponding to the specified portion of the candidate window 60. The histogram 245 represents the distribution of luminance among pixels of the specified portion of the candidate window 60. The total number of pixels of the specified portion of the candidate window 60 corresponds to the sum of all the bins of the histogram 245.

The histogram 245 shows that the set of pixels 26 corresponding to the dark pixels within the specified portion of the candidate window 60 is distributed over luminance levels in the lower-third portion the luminance's dynamic range, and that the set of pixels 42\* corresponding to the bright pixels within the specified portion of the candidate window 60 is distributed over luminance levels grouped in a narrow interval at the high-end portion the luminance's dynamic range. As in the histogram 235, note the presence of the luminance gap between the sets of pixels 26 and 42\* corresponding to the dark and bright pixels, respectively, within the specified portion of the candidate window 60 is preserved unchanged. Once again, the number of pixels of set 26 corresponding to the dark pixels within the inset square 62 is about equal to the number of pixels of set 42\* corresponding to the bright pixels within the inset square 62.

Also note that, in this example, the luminance range R2 corresponding to the specified portion of the candidate window 60 is about equal to the luminance's dynamic range. Accordingly, a normalization scale corresponding to the specified portion of the candidate window 60 defined as the luminance's dynamic range divided by the luminance range R2 is about equal to 1. Therefore, whether obtained within the entire candidate window 60 or only within a specified portion of the candidate window 60, the respective normalization ranges are about equal to each other and equal to 1, R1=R2=1.

After performing the instance 200\* of method 200, the luminance variance of the candidate window 60 can be normalized 150 in accordance with the method 110. For example, normalizing 150 a luminance variance of the candidate window 60 based on the obtained normalization scale corresponding to the specified portion of the candidate window 60 (as shown in instance 10"-1 of the digital image 10)

can lead to contrast for portions of a face contained in candidate window 60 that is similar to contrast obtained from normalizing the luminance variance within candidate window 60 based on the normalization scale corresponding to the candidate window 60 (as shown in instance 10-1 of the digital image 10.)

Figure 3:
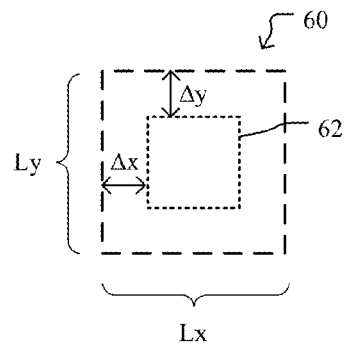
FIG. 3 shows experimental results obtained based on methods described in this specification.
Figure 3:
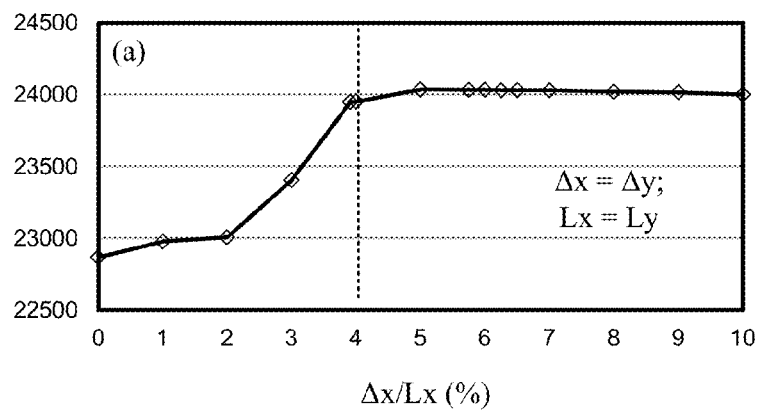
Figure 3:
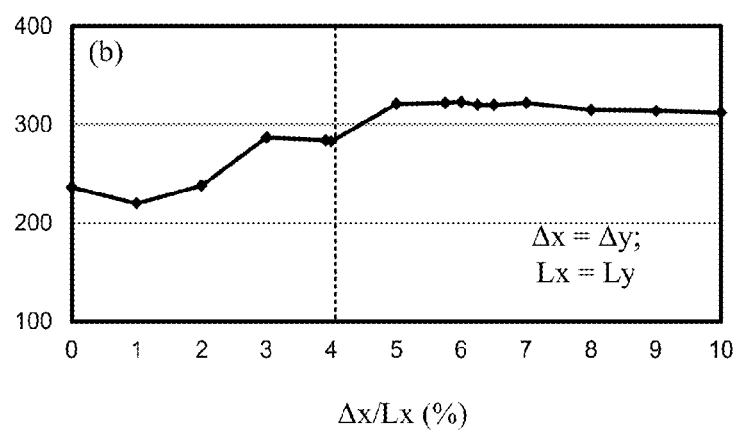

FIG. 3 shows experimental results obtained based on methods 100, 110 and 200 described in this specification. A candidate window 60 can be a rectangle having sizes Lx and Ly. An example of the candidate window 60 is depicted in FIG. 3 as a dashed-line rectangle. In some implementations, the candidate window 60 can be a square, Lx=Ly. A region within the candidate window 60 for calculating the normalization scale can be specified to exclude a preset fraction of pixels of the candidate window 60 such that the specified region has a convex shape. An example of the specified region 62 is depicted in FIG. 3 as a dotted-line rectangle within the candidate window 60. An inset value $\Delta x$ can be used to specify a reduction in the size of Lx for the candidate window 60 corresponding to the inset rectangle 62. Similarly, an inset value $\Delta y$ can be used to specify a reduction in the size of Ly for the candidate window 60 corresponding to the inset rectangle. In some implementations, the inset values $\Delta x$ and $\Delta y$ are the same: $\Delta x = \Delta y$.

Panel (a) shows a graph 310 depicting test results for determining correctly detected faces vs. a fraction $\Delta x/L$ (%). Panel (b) shows a graph 320 depicting test results for determining false positives vs. the fraction $\Delta x/L$ (%). The tests were carried out for square candidate windows, Lx=Ly, and for equal insets corresponding to Lx and Ly: $\Delta x = \Delta y$. The x-axis of graphs 310 and 320 can be used to determine an area of the inset rectangle 62 relative to the area of the candidate window 60. For x/Lx=0, the inset square 62 represents 100% of the area of the candidate window 60, i.e., no inset square was used.

For example, for x/Lx=2%, the inset square 62 represents 92% of the area of the candidate window 60. For inset squares 62 having an area less than 92% of the candidate window 60, an increase in the number of correctly detected faces can be observed. As another example, for x/Lx=4%, the inset square 62 represents 85% of the area of the candidate window 60. For inset squares 62 having an area less than 85% of the candidate window 60, the increase in the number of correctly detected faces levels off, while the number of false positives continues to increase. As yet another example, for x/Lx=5%, the inset square 62 represents 81% of the area of the candidate window 60. For inset squares 62 having an area less than 81% of the candidate window 60, the increase in the number of correctly detected faces and the increase in the number of false positives have reached saturation.

The tests have been carried out on 24,600 images. When an inset square 62 is used, an adjusted face detection algorithm based on methods 100, 110 and 200 enables detection of ~1100 faces more than when not using the inset square 62 (out of ~24600 faces), while increasing the false positives by ~85. Different inset values $\Delta x/L$ (%) can be used depending what trade-off between false negatives and false positives is desired. Based on experimentation, a 92.2% of the candidate window 60 was chosen (inset all sides by 3.91%). That value was chosen for computational elegance: $5/128$ is efficient to compute in fixed-point arithmetic, and results in a 4.4% improvement in detection rate.

Based on these results, in some implementations a predetermined fraction of the candidate window 60 and the inset square 62 can be larger than 80%. In some implementations, the predetermined fraction of the candidate window 60 included in the inset square 62 can be less than 95%. In some implementations, the predetermined fraction of the candidate window 60 included in the inset square 62 is about 92%.

Figure 4:
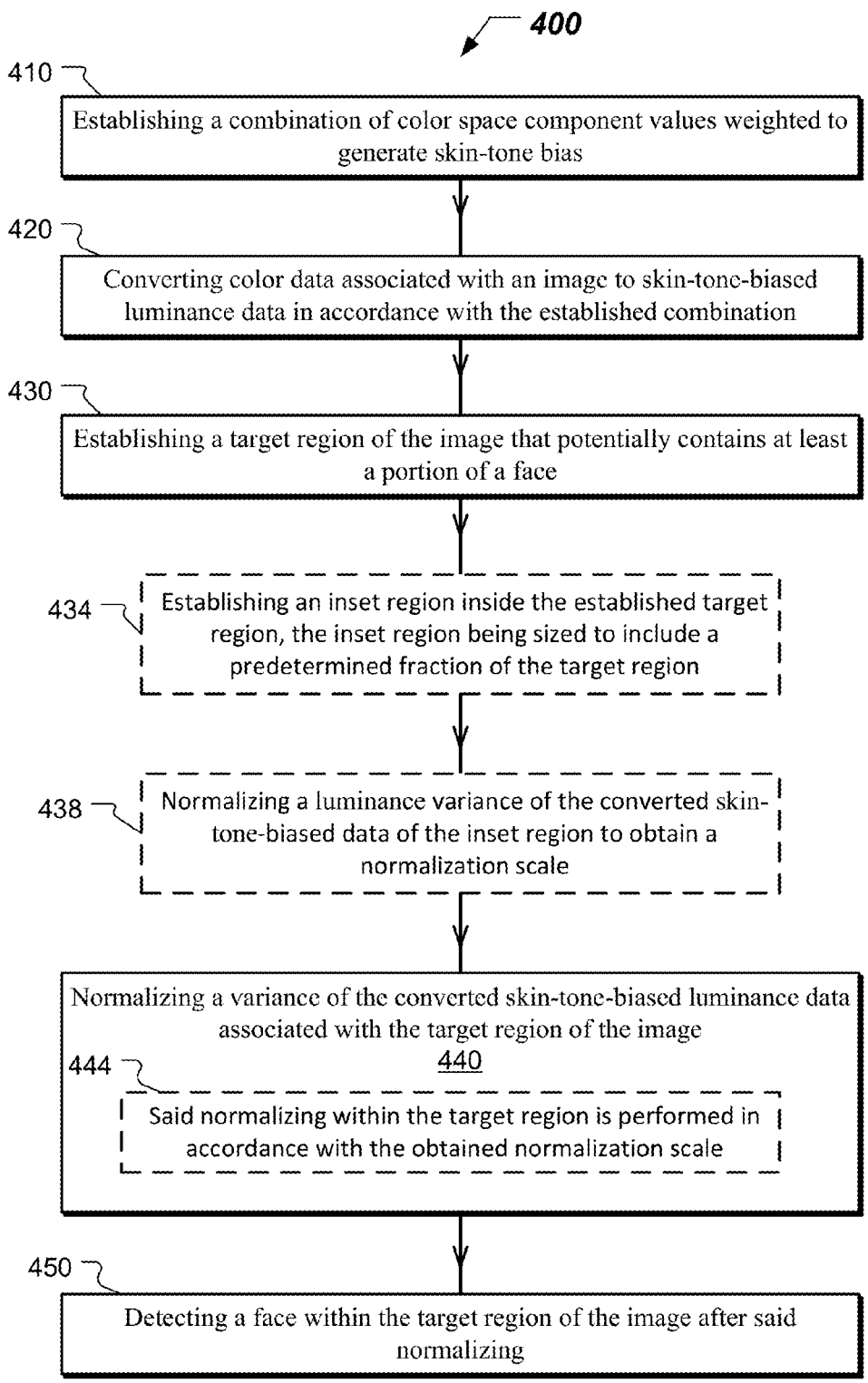
FIG. 4 is a flow chart of an example method for detecting a portion of a face depicted in a color image.

FIG. 4 is a flow chart of an exemplary method 400 for detecting a portion of a face depicted in a color image by biasing the image's luminance data towards skin-tone prior to using candidate windows. In some implementations, method 400 can be performed by data processing apparatus and can be combined with the process 100 and/or with methods 110 and 200 described above in this specification.

The method 400 includes establishing 410 a combination of color space component values weighted to generate skin-tone bias. For example, a linear combination alpha*Y+(1-alpha)*Cr can be used for images in YCbCr color-space. Alpha=1 corresponds to the unmodified YCbCr grey-levels. Red-bias increases as alpha decreases from 1 to 0. For example, it was determined experimentally that alpha=0.6 corresponds to skin-tone bias and produces the best test results, as described below in connection with FIG. 5. In addition, cyan-bias increases as alpha increases larger than 1.

The method 400 further includes converting color 420 data associated with an image to skin-tone-biased luminance data in accordance with the established combination. By performing a particular conversion of image data from color to grey-scale to bias the image's luminance towards skin-tone, the contrast of face-specific features can be selectively pre-enhanced, even before normalizing the luminance variance.

Also, the method 400 includes establishing 430 a target region of the image that potentially contains at least a portion of a face. The target region can correspond to facial detection algorithms that are known in the art, such as the Viola Jones, Rowley Baluja Kanade, or Schneiderman Kanade algorithms. In some implementations, the target region can be a square. Further, the candidate window can be established to have a corresponding size and can be associated with a location along a corresponding analysis path for a given stage of the facial detection algorithm. Examples of target regions representing candidate windows established at several locations along an analysis path are illustrated above in connection with FIGS. 2A-2C.

Further, the method 400 includes normalizing 440 a variance of the converted skin-tone-biased luminance data associated with the target region of the image. Normalizing 440 the converted skin-tone-biased luminance variance within the target region can include obtaining a normalization scale dividing the luminance's dynamic range to a luminance range within the target region.

Furthermore, the method 400 includes detecting 450 a face within the target region of the image after said normalizing. A classifier-based facial detection process, e.g. the Viola Jones algorithm, can be applied for detecting 450 portions of a face within a candidate window after having normalized 440 the converted skin-tone-biased luminance variance of the candidate window.

Optionally, the method 400 can include establishing 434 an inset region inside the established target region. The inset region is sized to include a predetermined fraction of the target region. Establishing 434 the inset region inside the target region can be performed as described above in accordance with aspect 130 of method 110, and with method 200.

The method 400 can further include, optionally, normalizing 438 a luminance variance of the converted skin-tone-biased data of the inset region to obtain a normalization scale. Normalizing 438 the luminance variance of the converted skin-tone-biased data of the inset region can be performed as described above with respect to aspect 140 of method 110, and with method 200. Normalizing 440 the variance of the converted skin-tone-biased luminance data associated with the target region of the image can be optionally performed 444 in accordance with the obtained normalization scale.

Figure 5:
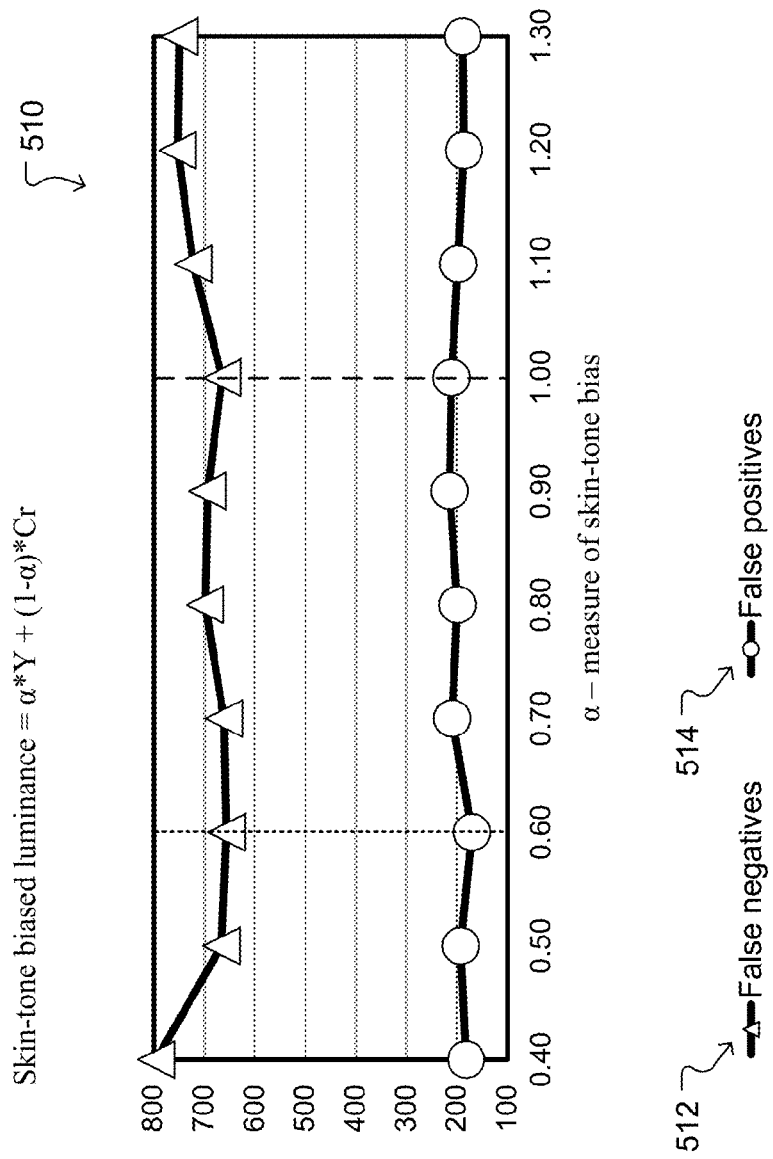
FIG. 5 shows additional experimental results obtained based on the methods described in this specification.

FIG. 5 shows additional experimental results obtained based on the methods 110, 200 and 400 described in this specification. Graph 510 represents test results for quantifying false negatives (depicted as triangles) and false positive (depicted as circles) in regards with face detection as a function of alpha—a measure of skin-tone-bias applied to image data prior to performing facial detection procedures.

Each of the over 24,000 test images was first converted in YCbCr space, where Y is the luminance, and (Cr, Cb) is the chrominance. Moreover, instead of using the Y channel for feature detection, a linear combination alpha*Y+(1-alpha)*Cr was used. For example, alpha=1 corresponds to the regular YCbCr space. Values of alpha greater than 1 provide cyan-bias, while values of alpha less than 1 provide red-bias to the luminance component Y. Facial detection techniques were performed on the test images after applying the foregoing color-space conversion. Normalization of the converted skin-tone-biased luminance variance within candidate windows used by the face detection algorithms was performed based on normalization scales corresponding to inset windows of the candidate windows, in accordance with methods 110 and 200.

Improvement in face detection rate was obtained when the linear combination used to bias the luminance data used a value of alpha=0.6. For this value of alpha, approximate 40 more faces were detected and approximate 40 less false positives were noted, when compared with alpha=1. Parameter alpha represents a measure of skin-tone-bias of the luminance conversion, and both the plot of false negatives 512 and the plot of false positives 514 have minima at alpha=0.6. Further, by selecting values of alpha between 0.5 and 0.7 the contrast of face-specific features can be pre-enhanced prior to normalizing the luminance variance.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer)

processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film-Transistor Liquid Crystal display or an Organic Light Emitting Diode display, or other appropriate display technology. The display interface may include appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly implemented in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    establishing a combination of color space component values weighted to generate skin-tone bias;
    converting color data associated with an image to skin-tone-biased luminance data in accordance with the established combination to generate a color-converted image;
    establishing a target region of the color-converted image that potentially contains at least a portion of a face;
    establishing an inset region inside the established target region, the inset region being sized to include a predetermined fraction of the target region;
    normalizing a luminance variance of the inset region to obtain a normalization scale;
    normalizing a luminance variance of the target region based on the obtained normalization scale; and
    detecting a face within the established target region using the established inset region.

2. The method of claim 1, wherein the predetermined fraction of the target region included in the inset region is larger than a first fractional value.

3. The method of claim 2, wherein the predetermined fraction of the target region included in the inset region is less than a second fractional value.

4. The method of claim 1, wherein the inset region corresponds to a convex portion of the target region, the portion having a size equal to the predetermined fraction of the target region.

5. The method of claim 4, wherein the portion of the target region corresponding to the inset region is sized and positioned relative to the target region such that, when the target region inscribes a face, the inset region is (i) sufficiently large to include at least eyes, a nose and a mouth of the inscribed face, and is (ii) sufficiently small to exclude portions of the established target region that are not part of the inscribed face.

6. The method of claim 1, wherein the inset region corresponds to portions of the target region excluding outlier values of luminance, the portions having a cumulative size equal to the predetermined fraction of the target region.

7. The method of claim 1, wherein the act of establishing a combination of color space component values comprises determining a value, alpha, for use in the equation: alpha*Y+ (1-alpha)*Cr, wherein Y refers to luminance value and Cr refers to red chrominance value.

8. The method of claim 1, wherein the act of obtaining a normalization scale further comprises dividing a dynamic range of luminance for the image by a dynamic range of the inset region.

9. The method of claim 1, wherein the act of obtaining a normalization scale further comprises analyzing a histogram representing a distribution of luminance among pixels of the inset region.

10. An appliance comprising:
    a memory configured to store an image; and
    a processor communicatively coupled with the memory and configured to perform operations comprising:
        establishing a combination of color space component values weighted to generate skin-tone bias;
        converting color data associated with the image to skin-tone-biased luminance data in accordance with the established combination to generate a color-converted image;
        establishing a target region of the color-converted image that potentially contains at least a portion of a face;
        establishing an inset region inside the established target region, the inset region being sized to include a predetermined fraction of the target region;
        normalizing a luminance variance of the inset region to obtain a normalization scale;
        normalizing a luminance variance of the target region based on the obtained normalization scale; and
        detecting a face within the established target region using the established inset region.

11. The appliance of claim 10, wherein the predetermined fraction of the target region included in the inset region is larger than a first fractional value.

12. The appliance of claim 11, wherein the predetermined fraction of the target region included in the inset region is less than a second fractional value.

13. The appliance of claim 10, wherein the inset region corresponds to a convex portion of the target region such that the portion has a size equal to the predetermined fraction of the target region.

14. The appliance of claim 10, wherein the inset region corresponds to portions of the target region excluding outlier values of luminance such that the portions have a cumulative size equal to the predetermined fraction of the target region.

15. The appliance of claim 10, wherein the operation of establishing a combination of color space component values comprises determining a value, alpha, for use in the equation: alpha*Y+(1-alpha)*Cr, wherein Y refers to luminance value and Cr refers to red chrominance value.

16. The appliance of claim 10, wherein the operation of obtaining a normalization scale further comprises dividing a dynamic range of luminance for the image by a dynamic range of the inset region.

17. The appliance of claim 10, wherein the operation of obtaining a normalization scale further comprises analyzing a histogram representing a distribution of luminance among pixels of the inset region.

18. A non-transitory computer storage medium encoded with a computer program, the program comprising instructions that when executed by data processing apparatus cause the data processing apparatus to perform operations comprising:
 establishing a combination of color space component values weighted to generate skin-tone bias;
 converting color data associated with an image to skin-tone-biased luminance data in accordance with the established combination to generate a color-converted image;
 establishing a target region of the color-converted image that potentially contains at least a portion of a face;
 establishing an inset region inside the established target region, the inset region being sized to include a predetermined fraction of the target region;
 normalizing a luminance variance of the inset region to obtain a normalization scale;
 normalizing a luminance variance of the target region based on the obtained normalization scale; and
 detecting a face within the established target region using the established inset region.

19. The computer storage medium of claim 18, wherein the predetermined fraction of the target region included in the inset region is larger than a first fractional value.

20. The computer storage medium of claim 19, wherein the predetermined fraction of the target region included in the inset region is less than a second fractional value.

21. The computer storage medium of claim 18, wherein the inset region corresponds to a convex portion of the target region, the portion having a size equal to the predetermined fraction of the target region.

22. The computer storage medium of claim 18, wherein the inset region corresponds to portions of the target region excluding outlier values of luminance, the portions having a cumulative size equal to the predetermined fraction of the target region.

23. The computer storage medium of claim 18, wherein the operation of establishing a combination of color space component values comprises determining a value, alpha, for use in the equation: alpha*Y+(1-alpha)*Cr, wherein Y refers to luminance value and Cr refers to red chrominance value.

24. The computer storage medium of claim 18, wherein the operation of obtaining a normalization scale further comprises dividing a dynamic range of luminance for the image by a dynamic range of the inset region.

25. The computer storage medium of claim 18, wherein the operation of obtaining a normalization scale further comprises analyzing a histogram representing a distribution of luminance among pixels of the inset region.

26. A method performed by data processing apparatus, the method comprising:
 establishing a combination of color space component values weighted to generate skin-tone bias;
 converting color data associated with an image to skin-tone-biased luminance data in accordance with the established combination to generate a color-converted image;
 establishing a target region of the color-converted image that potentially contains at least a portion of a face;
 establishing an inset region inside the established target region, the inset region being sized to include a predetermined fraction of the target region, the predetermined fraction being larger than a first fractional value and smaller than a second fractional value;
 normalizing a luminance variance of the inset region to obtain a normalization scale;
 normalizing a luminance variance of the target region based on the obtained normalization scale; and
 detecting a face within the target region using the established inset region.

27. The method of claim 26, wherein the inset region corresponds to a rectangular portion of the target region, the rectangular portion having a size equal to the predetermined fraction of the target region.

28. The method of claim 26, wherein the act of establishing a combination of color space component values comprises determining a value, alpha, for use in the equation: alpha*Y+(1-alpha)*Cr, wherein Y refers to luminance value and Cr refers to red chrominance value.

29. The method of claim 26, wherein the act of obtaining a normalization scale further comprises dividing a dynamic range of luminance for the image by a dynamic range of the inset region.

30. The method of claim 26, wherein the act of obtaining a normalization scale further comprises analyzing a histogram representing a distribution of luminance among pixels of the inset region.

* * * * *